United States Patent Office 3,050,425
Patented Aug. 21, 1962

3,050,425
QUICK-TACK POLYMERIC ADHESIVE FOR FIBROUS LAMINAE
Charles A. Carr, Jr., Ambler, and Louis E. Kelley, Wyncote, Pa., assignors to Rohm & Haas Company, Philadelphia, Pa., a corporation of Delaware
No Drawing. Filed Mar. 25, 1959, Ser. No. 801,689
14 Claims. (Cl. 154—46)

This invention relates to (1) novel compositions adapted to be used as adhesives especially for application to paper, (2) laminar structures, and methods of making the latter. This application is a continuation-in-part of our copending United States application Serial No. 669,-383, filed July 1, 1957, now abandoned.

An object of the present invention is to provide an adhesive composition which is water-soluble but is adapted upon drying to form a water-resistant film which is tough and adherent toward the substrate upon which the composition has been applied. Another object is to provide a composition adapted to form a tough film which is hard but not characterized by such brittleness that the adhered structure is easily ruptured on flexing or upon impact. Another object is to provide a composition which is characterized by reasonably low viscosity and high concentration so that sufficient film-forming or adhesive material can be applied from the aqueous dispersion thereof to form a continuous adhesive interlayer on drying. Other objects and advantages of the invention will appear in the following description.

Polymers of methacrylic acid and copolymers thereof have heretofore been employed as adhesive materials. However, it has generally been found that the polymers heretofore used which, in all cases, had molecular weights of several million have either been difficult to handle because of high viscosity of the aqueous solutions of salts thereof or they have formed extremely brittle adhesive films which readily rupture upon the slightest flexing, impact, or even in some cases merely at the conclusion of complete drying, or they have formed adhesive layers which are not resistant to water. As pointed out hereinabove, one of the objects of the present invention is to provide a composition which forms an adhesive layer which is resistant to water and the test for determining this characteristic is to soak a structure obtained by the use of the adhesive composition in water for a period of time of 72 to 168 hours.

In accordance with the present invention, it has been discovered that the ammonium salts of certain ternary copolymers of methacrylic acid provide the combination of properties needed for the purpose of the present invention and which form the objects set out hereinabove.

An essential characteristic of the copolymers of the present invention is that they have comparatively low molecular weight. Since methacrylic acid polymer salts have such viscosity in aqueous solutions that their molecular weight is difficult to determine, the size of the polymer is herein defined by reference to the viscosity of an aqueous solution of the ammonium salt of the copolymer at a concentration of 10% obtained by the addition of 1.5 equivalents of ammonium hydroxide to the copolymer to neutralize it. Copolymer salts which meet the requirements of the present invention have a viscosity in the range of 1.5 to 10 poises, preferably 2 to 4 poises, when measured in a 10% solution in water at 25° C.

Another essential characteristic is the fact that the copolymer before neutralization with ammonia, contains from 23 to 30% by weight of methacrylic acid and preferably in the range of 23 to 26% by weight thereof. However, it is essential also that the copolymer contain both methyl methacrylate and an acrylic acid ester of ethyl or methyl alcohol. The proportion of methyl methacrylate should be in the range of about 20 to 57% by weight and the proportion of ethyl acrylate, methyl acrylate, or mixtures thereof should be between 20 and 57% by weight. The inclusion of both the methyl methacrylate component and the acrylic acid ester component is quite important since the omission of the acrylic acid ester results in a polymer which is extremely brittle and lacking in toughness and a structure bonded with a film of such a copolymer salt is readily broken by flexing or impact. On the other hand, a complete absence of methyl methacrylate results in a structure, the adhesive film of which lacks resistance to water.

Surprisingly, the ammonium salts of ternary copolymers containing 23 to 30% of methacrylic acid, 20 to 57% of methyl methacrylate, and 20 to 57% by weight of one of the lower acrylates mentioned above and having the low molecular weights specified above in terms of the aqueous viscosity are characterized with a combination of properties making the composition extremely useful as an adhesive. Not only do the ammonium salts of such copolymers provide aqueous solutions which can be made up in adequate concentration without excessive viscosity so that continuous adhesive films are deposited but the proper balancing of the several comonomers in the ranges specified results in the deposition of an adhesive layer which is free from brittleness and has high resistance to water.

The aqueous solution or dispersion of the ammonium salts of the copolymer of the present invention may have incorporated therein various fillers such as clay, calcium carbonate, or pigments, or dyes. The amount of such fillers or pigments may vary from about 1% to 100% by weight thereof based on the total weight of the binder whether the latter consists entirely of the copolymer salt or comprises other binders besides the polymer salt. Surprisingly, a substantial proportion of such fillers as clay may be included without destroying the adhesive character of the copolymer salt. The compositions may also be used for the mineral coating of paper or paperboard. For this purpose, the copolymer salts used are preferably those having a viscosity from about 1.5 to 5 poises in a 10% solution in water at 25° C. Other adhesive materials may be employed in conjunction with the copolymer salts. The addition of 5 to 10% of one of the copolymer salts of the present invention to aqueous compositions comprising casein or α-protein improves the water-resistance thereof remarkably. From 1 to 100% by weight, based on the weight of copolymer salt, of other water-soluble or dispersible adhesive materials such as starch, dextrin, glue, gelatin, casein, or the like may be incorporated into the aqueous polymer salt solution. For the mineral coating of papers, the binder (which may be used in an amount of about 8 to 25%, and preferably 12 to 16%, on the weight of mineral, such as clay) may comprise 50 to 100% by weight of a copolymer salt of the present invention and 0% to 50% by weight of one of the adhesive materials just mentioned or of a water-insoluble emulsion polymer, having a $T_1$ of 20° C. or less, of monoethylenically unsaturated molecules such as of at least one ester of acrylic acid or methacrylic acid with an alkanol having 1 to 8 or more carbon atoms, especially of methyl acrylate, ethyl acrylate, butyl acrylate, or methyl methacrylate, with or without ½ to 8% by weight in the copolymer molecule of an acid, such as acrylic acid, methacrylic acid, or itaconic acid, or ½ to 10% of an amide, such as an amide of one of these acids, or maleamide, or of a mixture of one of these acids or amides. Thus, the copolymer salts may be used in admixture in the amounts specified with the copolymers of United States Patents 2,790,735, 2,790,736, and 2,874,066. The characteristic, $T_i$, is the apparent second order transition temperature as defined in the aforesaid patents and the definition and the constitution of the polymers of these patents are incorporated herein by reference. These mixtures can be made of high solids content and with high viscosity, thereby reducing drying capacity and/or drying time needed, and avoiding difficulties with irregular application that frequently accompanies the application of high solids systems based on water-insoluble emulsion copolymers as the sole binder.

The aqueous polymer salt solutions may be employed for adhering of various materials together. They are useful in adhering paper to itself or to other substrates, such as wood and textile fabrics, in the formation of various laminated structures. They are quite useful in the formation of bags from wrapping papers such as kraft paper and also for the formation of cartons and boxes by adhesion of the flaps of boxboard blanks. They are especially advantageous for use as the adhesive to bind a corrugated filler ply to the outer flat plies in making corrugated paperboard. The dispersions have good tack properties when applied with suitable concentration such as at a concentration of about 8 to 15% or more.

The adhesives may be applied by any suitable procedure such as brushing, swabbing, spraying, dipping, and so on. The concentration at which they are applied may be varied depending upon the particular manner of application. In general, the concentration may range from 5 to 25% but for most brush applications, concentration of about 10 to 12% is preferred.

The low molecular weight copolymers may be made by various procedures, e.g., emulsion or suspension. In general, a suspension process employing an appropriate amount of a chain regulator is most suitable, and is generally preferable as it gives outstanding resistance to water. In general, the polymerization may be effected by introducing a mixture of the several monomers in appropriate proportions, a free radical polymerization initiator, and a chain regulator into a salt brine, which may contain thickeners or suitable suspension agents, especially hydrophilic colloid materials such as water-soluble methyl celluloses, hydroxyethyl celluloses, carboxymethyl celluloses, polyvinyl alcohols, polymethacrylic acid, and hydrolyzed polyacrylonitrile.

The initiator may be an organic peroxide such as benzoyl peroxide, acetyl peroxide, lauroyl peroxide, or it may be an azo compound such as diisoazobutyronitrile. The amount of the initiator may vary from about 0.5% to 6% by weight of the total weight of the monomers. The amount of the chain regulator may vary from 0.1 to 1.5% more or less depending upon the particular chain regulator. Examples of chain regulators include long-chain alkyl mercaptans, e.g., t-dodecyl mercaptan, octyl mercaptan, octadecyl mercaptan, alcohols, such as isopropanol, isobutanol, or higher alcohols, such as t-octyl alcohol and lauryl alcohol, carbon tetrachloride, ethylene tetrachloride $C_2Cl_4$, bromotrichloromethane, and substituted allyl chloride, such as methallyl chloride.

The brine employed is formed by any suitable salt such as sodium sulfate, sodium chloride, or the like at concentrations from about 20% up to saturation. The amount of thickening agent may vary from 0.1 to 2% by weight of the brine solution.

In the following examples which are illustrative of the invention, the parts and percentages are given by weight unless otherwise indicated.

EXAMPLE 1

Charge (A) Suspension phase:

|   | Gms. |
|---|---|
| (1) 25% NaCl brine | 1500 |
| (2) 4% hydroxyethylcellulose in water | 110 |

(B) Monomer phase:

|   | Gms. |
|---|---|
| (3) Ethyl acrylate | 250 |
| (4) Methacrylic acid (glacial) | 250 |
| (5) Methyl methacrylate | 500 |
| (6) Benzoyl peroxide | 7.5 |
| (7) Bromotrichloromethane | 10 |

Procedure

The suspension agent (2) is dissolved in the brine suspension medium (1). The solution is then charged to a polymerization flask equipped with a two-bladed stainless steel stirrer, thermometer, and condenser. The monomer phase is mixed in the order listed and after solution, added to the polymerization flask. Agitation is applied; the quality of the dispersion is controlled by employing intermittent agitation (3 minutes on; 1 minute off) until the desired particle size is obtained. Heat is then applied to the flask and the polymerization carried out for three hours at 77° C. to 81° C.

At the end of the polymerization the product is washed with water to remove the brine, suspension agent, etc., and is then filtered. The product (clear beads) can be used in a dried or wet filter cake form.

A portion of the dried copolymer was dissolved in aqueous ammonia containing 1.5 equivalents of ammonia on the acid units and the concentration was adjusted to 10%. The viscosity of the resulting solution was 3.1 poises at 25° C. The solution was applied to unbleached kraft wet strength paper and another sheet of the same paper was applied to the coated surface of the first. After drying, the laminate was soaked for 72 hours in water at room temperature. On pulling the sheets apart, 90% of the failure occurred in the paper layer or layers.

The quick-tack strength was tested as follows:

The solution was applied to one surface of another sheet of the same unbleached kraft wet strength paper and another sheet of the same was applied to the coated surface. The laminate, right after assembly, was placed in an oven at 100° F. for 15 seconds. On pulling apart, 100% of the failure occurred in the paper layer or layers.

EXAMPLE 2

The procedure of Example 1 was followed except that the amount of chain regulator was cut in half. The ammonium salt at 10% concentration in water and at 25° C. had a viscosity of 8.2 poises, A laminate prepared as in Example 1 showed 90% failure in the paper on the quick-tack test and 80% failure in the paper after a 72-hour soak.

EXAMPLE 3

The procedure of Example 1 was followed except that 15 grams of methallyl chloride was used in place of the 10 grams of bromotrichloromethane. The 10% aqueous viscosity of ahe ammonium salt at 25° C. was 6 poises. A paper laminate prepared in the same way as that of Example 1 showed 90% failure in the paper after the 72-hour soak and 100% failure in the paper after the quick-tack test.

EXAMPLE 4

The solution of Example 1 was applied to unbleached kraft wet strength paper boards. The failure of the bonds was entirely in the board when tested after a 72-hour soak and on quick-tack testing.

EXAMPLE 5

The ammonium salt of a copolymer of a mixture of 43.7% by weight of ethyl acrylate, 26.3% by weight of methyl methacrylate, and 30% by weight of methacrylic acid was applied to bond two pieces of a coated chipboard. The bond was good even after a 72-hour soak.

EXAMPLE 6

The ammonium salt of a copolymer of a mixture of 27% by weight of ethyl acrylate, 50% by weight of methyl methacrylate, and 23% by weight of methacrylic acid was applied to bond two pieces of a coated chipboard. The bond was excellent even after a 72-hour soak.

EXAMPLE 7

An adhesive composition was made up by mixing 71 parts of a (70% solids) clay suspension in water, 357 parts by weight of a 7% starch solution in water, and 250 parts by weight of the 10% solution of the ammonium salt of Example 1. Two sheets of unbleached kraft wet strength paper were adhered together. The failure on quick-tack testing was 100% in the paper. The failure after a 72-hour soak was 100% in the paper.

Good bonding is effected between unbleached kraft wet strength paper and plies of birchwood. Failure occurs in the paper layer after soaking 72 hours.

Good bonding occurs in adhering corrugated-paper-filled boxboards. Failure occurs in the paper layer both after soaking and on the quick-tack test.

EXAMPLE 8

Eighty parts of fine coating clay (kaolin), 20 parts of titanium dioxide, 0.2 part of sodium hexametaphosphate were mixed in 48 parts of water, and 0.2% (on the weight of clay) of ammonium hydroxide was added to adjust the pH to 9. The mixture thus obtained was added to 12.5 parts of an aqueous dispersion of a copolymer having a $T_i$ of about —3° C. obtained by the emulsion copolymerization of a mixture of 87 parts of ethyl acrylate, 10.5 parts of methyl methacrylate, and 2.5 parts of itaconic acid in about 100 parts of water in the presence of 6 parts of a t-octylphenoxypolyethoxyethanol containing about thirty oxyethylene units, and a catalyst, such as small amounts of ammonium persulfate and sodium hydrosulfite. After polymerization, ammonium hydroxide was added to adjust the composition to a pH of 9. Then there is added 12.5 parts of a copolymer of 27% of ethyl acrylate, 50% of methyl methacrylate, and 23% of methacrylic acid, obtained as in Example 1 but with only half as much bromotrichloromethane and having a viscosity of about 1.5 poises at 10% concentration and 25° C.

A dry chipboard (0.017 inch thick) was then coated with the composition (which contained 12% of copolymer on the weight of pigment) by means of a No. 12 wire-wound rod. About 5 to 6 pounds of the coating composition (dry weight) per 1,000 sq. ft. of the board was thus applied to one surface. The coated board was dried in an oven by air heated at 185° F. for a period of 45 to 60 seconds. It was then calendered by rolls at room temperature at a pressure of 50 lbs./lineal inch. The coated board had a good, smooth surface highly receptive to ink and resistant to pick (that is removal) by inks having a tack corresponding to No. 5.

It is to be understood that changes and variations may be made without departing from the spirit and scope of the invention as defined by the appended claims.

We claim:

1. A laminar structure comprising at least one fibrous layer adhered to another substrate by an adhesive layer comprising a dried product of (1) a polymeric material consisting exclusively of an ammonium salt of a copolymer of 23 to 30% by weight of methacrylic acid, 20 to 57% by weight of methyl methacrylate, and 20 to 57% by weight of at least one compound selected from the group consisting of methyl acrylate and ethyl acrylate, the salt being of low molecular weight such that its viscosity in water at 25° C. and 10% concentration is between about 1.5 and about 10 poises and (2) 1 to 100% by weight, based on the weight of ammonium copolymer salt, of a material selected from the group consisting of starch, dextrin, gelatin, glue, casein, and α-protein.

2. A structure as defined in claim 1 in which the adhesive layer comprises 1 to 100% by weight, based on the weight of the ammonium copolymer salt, of a filler.

3. A structure as defined in claim 1 in which the adhesive layer comprises 1 to 100% by weight, based on the weight of the ammonium copolymer salt, of clay.

4. A laminar structure comprising at least one paper layer adhered to another layer of paper by an adhesive layer comprising a dried product of (1) a polymeric material consisting exclusively of an ammonium salt of a copolymer of 23 to 30% by weight of methacrylic acid, 20 to 57% by weight of methyl methacrylate, and 20 to 57% by weight of at least one compound selected from the group consisting of methyl acrylate and ethyl acrylate, the salt being of low molecular weight such that its viscosity in water at 25° C. and 10% concentration is between about 1.5 and about 10 poises and (2) 1 to 100% by weight, based on the weight of ammonium copolymer salt, of a material selected from the group consisting of starch, dextrin, gelatin, glue, casein, and α-protein.

5. A structure as defined in claim 4 in which the adhesive layer comprises 1 to 100% by weight, based on the weight of the ammonium copolymer salt, of a filler.

6. A structure as defined in claim 4 in which the adhesive layer comprises 1 to 100% by weight, based on the weight of the ammonium copolymer salt, of clay.

7. A laminar structure comprising at least one paper layer adhered to a layer of wood by an adhesive layer comprising a dried product of (1) a polymeric material consisting exclusively of an ammonium salt of a copolymer of 23 to 30% by weight of methacrylic acid, 20 to 57% by weight of methyl methacrylate, and 20 to 57% by weight of at least one compound selected from the group consisting of methyl acrylate and ethyl acrylate, the salt being of low molecular weight such that its viscosity in water at 25° C. and 10% concentration is between about 1.5 and about 10 poises and (2) 1 to 100% by weight, based on the weight of ammonium copolymer salt, of a material selected from the group consisting of starch, dextrin, gelatin, glue, casein, and α-protein.

8. A structure as defined in claim 7 in which the adhesive layer cmprises 1 to 100% by weight, based on the weight of the ammonium copolymer salt, of a filler.

9. A structure as defined in claim 7 in which the adhesive layer comprises 1 to 100% by weight, based on the weight of the ammonium copolymer salt, of clay.

10. A method of forming laminar structures which comprises applying to a surface of at least one fibrous layer an adhesive comprising a dried product of (1) a polymeric material consisting exclusively of an ammonium salt of a copolymer of 23 to 30% by weight of methacrylic acid, 20 to 57% by weight of methyl methacrylate, and 20 to 57% by weight of at least one compound selected from the group consisting of methyl acrylate and ethyl acrylate, the salt being of low molecular weight such that its viscosity in water at 25° C. and 10% concentration is between about 1.5 and about 10 poises and (2) 1 to 100% by weight, based on the weight of ammonium copolymer salt, of a material selected from the group consisting of starch, dextrin, gelatin, glue, casein, and α-protein, applying another substrate to the coated surface of the fibrous layer, and then drying the adhesive while the substrate and layer are in contact therewith.

11. A method as defined in claim 10 in which the adhesive comprises 1 to 100% by weight, based on the weight of the ammonium copolymer salt, of a filler.

12. A method as defined in claim 10 in which the adhesive comprises 1 to 100% by weight, based on the weight of the ammonium copolymer salt, of a clay.

13. A composition comprising an aqueous solution of (1) a polymeric material consisting exclusively of an ammonium salt of a copolymer of 23 to 30% by weight of methacrylic acid, 20 to 57% by weight of methyl methacrylate, and 20 to 57% by weight of at least one compound selected from the group consisting of methyl acrylate and ethyl acrylate, the salt being of low molecular weight such that its viscosity in water at 25° C. and 10% concentration is between about 1.5 and about 10 poises and (2) from 1 to 100% by weight, based on the weight of ammonium copolymer salt, of a material selected from the group consisting of starch, dextrin, gelatin, glue, casein, and α-protein.

14. A composition comprising an aqueous solution of (1) a polymeric material consisting exclusively of an ammonium salt of a copolymer of 23 to 30% by weight of methacrylic acid, 20 to 57% by weight of methyl methacrylate, and 20 to 57% by weight of at least one compound selected from the group consisting of methyl acrylate and ethyl acrylate, the salt being of low molecular weight such that its viscosity in water at 25° C. and 10% concentration is between about 1.5 and about 10 poises and (2) from 1 to 100% by weight, based on the weight of ammonium copolymer salt, of a material selected from the group consisting of starch, dextrin, gelatin, glue casein, and α-protein, said composition containing 1 to 100% by weight, based on the weight of the copolymer salt, of a filler.

References Cited in the file of this patent

UNITED STATES PATENTS

| | | |
|---|---|---|
| 2,765,229 | McLaughlin | Oct. 2, 1956 |
| 2,795,564 | Conn et al. | June 11, 1957 |